United States Patent [19]
Ehlers et al.

[11] Patent Number: 5,848,582
[45] Date of Patent: Dec. 15, 1998

[54] INTERNAL COMBUSTION ENGINE WITH BAROMETIC PRESSURE RELATED START OF AIR COMPENSATION FOR A FUEL INJECTOR

[75] Inventors: Jeffrey C. Ehlers; Blake R. Suhre, both of Neenah, Wis.

[73] Assignee: Brunswick Corporation, Lake Forest, Ill.

[21] Appl. No.: 939,829

[22] Filed: Sep. 29, 1997

[51] Int. Cl.⁶ .............................. F02M 67/02; F02D 41/04
[52] U.S. Cl. ......................... 123/486; 123/73 C; 123/531
[58] Field of Search ................. 123/73 C, 478, 123/486, 531, 532, 533, 534

[56] References Cited

U.S. PATENT DOCUMENTS

| | | | |
|---|---|---|---|
| 4,693,224 | 9/1987 | McKay | 123/531 |
| 4,753,213 | 6/1988 | Schlunke | 123/533 |
| 4,754,735 | 7/1988 | Simons | 123/531 X |
| 4,825,828 | 5/1989 | Schlunke | 123/276 |
| 4,844,339 | 7/1989 | Sayer | 239/5 |
| 5,441,030 | 8/1995 | Satsukawa | 123/478 X |

*Primary Examiner*—Tony M. Argenbright
*Attorney, Agent, or Firm*—William D. Lanyi

[57] ABSTRACT

A control system for a fuel injector system for an internal combustion engine is provided with a method by which the magnitude of the start of air point for the injector system is modified according to the barometric pressure measured in a region surrounding the engine. This offset, or modification, of the start of air point adjusts the timing of the fuel injector system to suit different altitudes at which the engine may be operating.

20 Claims, 5 Drawing Sheets

INTERNAL COMBUSTION ENGINE WITH BAROMETIC PRESSURE RELATED START OF AIR COMPENSATION FOR A FUEL INJECTOR

BACKGROUND OF THE INVENTION

1. Field of the Invention

The present invention is generally related to the control of a fuel injected internal combustion engine and, more particularly, to the compensation of the start of air timing based on changes in barometric pressure.

2. Description of the Prior Art

Many different types of internal combustion engines are well known to those skilled in the art. Both fuel injection systems and the use of engine control units, or ECU's, are well known and have been used on many different engine designs.

U.S. Pat. No. 4,693,224, which issued to McKay on Sep. 15, 1987, discloses a fuel injection method and apparatus which is applicable to an internal combustion engine. A gas is supplied to a fuel holding chamber in order to maintain a reference pressure which is above atmospheric pressure in the fuel holding chamber. A metered quantity of fuel is delivered into the holding chamber against the reference pressure. Communication is established between the holding chamber and the engine, and the supply of gas to the holding chamber is maintained while the communication exists so that the pressure of the gas is sufficient to displace the metered quantity of fuel from the holding chamber to the engine.

U.S. Pat. No. 4,753,213, which issued to Schlunke et al on Jun. 28, 1988, describes the injection of fuel to an engine and, more particularly, into a combustion chamber of an internal combustion engine which is a two cycle spark ignited engine. The metered fuel quantity is entrained in a gas and the fuel and gas mixture is delivered through a nozzle into the combustion chamber under conditions that establish a fuel spray having a dispersion velocity in the direction of the spray axis. The dispersion velocity in the direction of the spray axis is not more than 25 meters per second at 35 millimeters of spray penetration from the nozzle when measured in still air at atmospheric pressure. Preferably, that dispersion velocity is not more than 18 meters per second at 70 millimeters from the nozzle.

U.S. Pat. No. 4,825,828, which issued to Schlunke et al on May 2, 1989, discloses a direct fuel injection system. More specifically, it describes improvements in fuel injection nozzles for spark ignited internal combustion engines to enable a metered quantity of fuel entrained in a gas to be delivered into a combustion chamber to optimize the efficiency of the operation of the engine. The fuel injection nozzle has a port and a valve which is movable relative to the port. The port and the valve have respective angular sealing faces which define an angular frustoconical shaped throat when the nozzle is open for the flow of metered fuel therethrough. The nozzle has a shroud which extends from the port surrounding the periphery of the valve when the nozzle is open and defining a delivery passage downstream of the throat in the direction of fuel flow towards the combustion chamber. The delivery passage is configured to be purged of fuel after each fuel delivery cycle to prevent carbon build-up in the nozzle.

U.S. Pat. No. 4,844,339, which issued to Sayer et al on Jul. 4, 1989, discloses a fuel injection apparatus for delivering a metered quantity of fuel to an engine. The apparatus comprises a valve controlled port through which the metered quantity of fuel is delivered to the engine. The valve is resiliently urged to a position to close the port. Electromagnetic means, operable when energized to displace said valve member from the closed position to permit delivery of the metered quantity of fuel through the port to the engine, is provided. The electromagnetic means includes an armature member movable in a first direction in response to energizing of the electromagnetic means to affect the opening of the port. The armature has a limited free movement in the first and the opposite directions independent of the valve member when the electromagnetic means is not energized and the valve member is in the port closed position.

The four patents described immediately above are hereby expressly incorporated by reference herein.

In certain types of fuel injection systems, such as those described immediately above, the injection of fuel actually comprises a two step procedure. The first step includes the injection of fuel into a chamber for a preselected period of time in order to cause a preselected amount of fuel to be deposited into the chamber at some known rate. Then, typically after the fuel flow into the chamber is completed, a pressurized air flow is provided to move the fuel from the chamber into a combustion chamber of the engine. Depending on the running characteristics of the engine, and the specific conditions under which it is operated, the starting and ending points for both the fuel injection period and the air injection period can vary. The starting and ending points for the air injection is typically calculated as a function of the total fuel injected per cylinder and the RPM. Known engine control units do not calculate an adjustment or offset for the start of air point based on changes in the barometric pressure. In other words, known engine control units do not adjust the determination of the start of air point if the engine is operated at altitudes that change the ambient air pressure surrounding the engine. This can result in inefficient operation if the internal combustion engine is operated at altitudes that are significantly different from the altitude for which it was originally calibrated.

SUMMARY OF THE INVENTION

Before describing the characteristics of the present invention, it is necessary to understand the basic components of a fuel injector system of this type and the functions of those components. FIG. 6 is a highly schematic illustration of the type of fuel injector system with which the present invention is intended to be used. In the patents described above, the basic configuration in FIG. 6 is used.

FIG. 6 shows a combustion chamber 60 of an internal combustion engine with a fuel injection system 62. The fuel injector system 62 has an internal chamber 64 formed within it. An air supply conduit 66 provides a generally constant flow of air, as represented by arrow A, at a pressure of approximately 80 psi. This maintains the pressure within the chamber 64 at approximately 80 psi. A fuel conduit 70 is connected to a fuel supply that is able to provide fuel into the chamber 64 at a pressure of approximately 90 psi. The flow of fuel through conduit 70 is controlled by a valve 74 that is able to start the fuel flow into the chamber 64 and stop the fuel flow into the chamber 64. Beginning with the start of fuel SOF, the chamber 64 begins to fill with fuel that travels through the fuel conduit 70 when the valve 74 is opened. The end of fuel EOF is defined as the instant when the valve 74 closes and stops causing fuel to flow into the chamber 64. The start of air SOA is defined as the time when valve 80 opens the conduit 84 to connect conduit 84 in fluid communication with the combustion chamber 60. The air within chamber 64 is at a higher pressure than the combustion chamber 60 and as a result, air rushes past the opened valve 80 and draws with it the fuel that is within the chamber 64 when the valve 80 is opened. As a result, a spray of fuel air mixture F/A enters the combustion chamber 60. The start of air SOA is defined as the instant when valve 80 opens and the end of air EOA is defined as the instant when the valve 80 closes conduit 84.

FIG. 6 does not show the fuel injection system in detail. In addition, it does not show the control mechanisms that are used to control the movement of valves 74 and 80. However, the patents described above discuss the operation of this type of fuel injection system in significant detail. In the terminology which will be used in the following discussion and description of the preferred embodiment, the total device associated with the combustion chamber 60 in FIG. 6 will be called the fuel injector system, the components relating directly to the injection of fuel into the chamber 64 will be referred to as the fuel injector, and the components used to start and stop the flow of air from the fuel injection system into the combustion chamber 60 will be referred to as the air injector.

A method for controlling a fuel injector system of an internal combustion engine made in accordance with the present invention comprises the steps of measuring the speed of the engine, measuring a barometric pressure and measuring the absolute pressure within a manifold of the engine. In addition, it comprises the steps of determining the piston position where fuel should begin to flow into the injector system, determining the piston position where that fuel should stop flowing, determining the piston position where air should begin to flow into the combustion chamber, and determining the piston position where air should stop flowing into the combustion chamber. Although the present invention will be described in terms of the piston position, it should be understood that it could alternatively be described in terms of crank angle. However, it should be understood that if the present invention is implemented on a four cycle engine, the piston position refers to the compression stroke as the piston rises in the cylinder prior to the activation of a spark plug.

Certain embodiments of the present invention further comprise the steps of measuring a temperature of the engine charge air entering the intake manifold and then determining a volumetric efficiency term as a function of the engine speed and the ratio of the absolute pressure within the manifold to the barometric pressure. In addition, it comprises the step of determining a mass air flow into the combustion chamber of the engine as a function of the air charge temperature, the absolute pressure within the manifold, and the barometric pressure.

The present invention can further comprise the step of determining the piston position to begin fuel flow and the piston position to end fuel flow as a function of a desired engine speed and a fuel flow rate empirically determined for the engine.

The engine can be a two cycle engine and can be disposed within an outboard motor for marine use. The method for controlling the fuel injector can be performed by an engine control unit comprising a microprocessor and a first look-up table can be stored in memory and used to determine the piston position at which to begin injector air flow into the combustion chamber and determine the piston position at which to end that air flow. In addition, a second look-up table stored in memory can be used to alter the piston position at which to begin injector air flow into the combustion chamber as a function of the barometric pressure.

The present invention improves the method for controlling a fuel injector by incorporating a means by which the piston position, or crank angle, at which to begin air flow into a combustion chamber can be modified in order to accommodate changes in barometric pressure that could otherwise adversely affect the operation of the engine.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
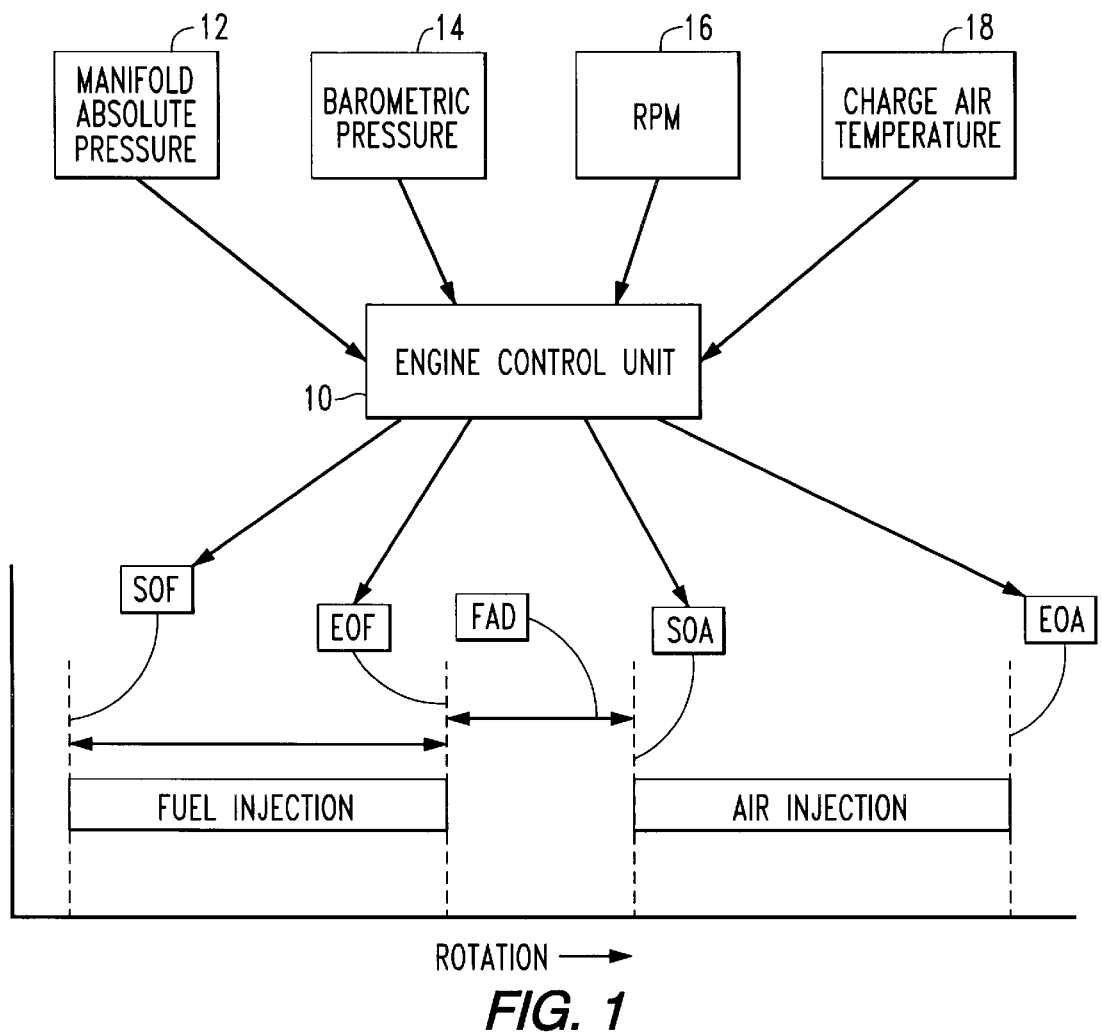
FIG. 1 is a schematic representation of the input and output parameters of an engine control unit.

Throughout the description of the preferred embodiment, like components will be identified by like reference numerals.

Figure 6:
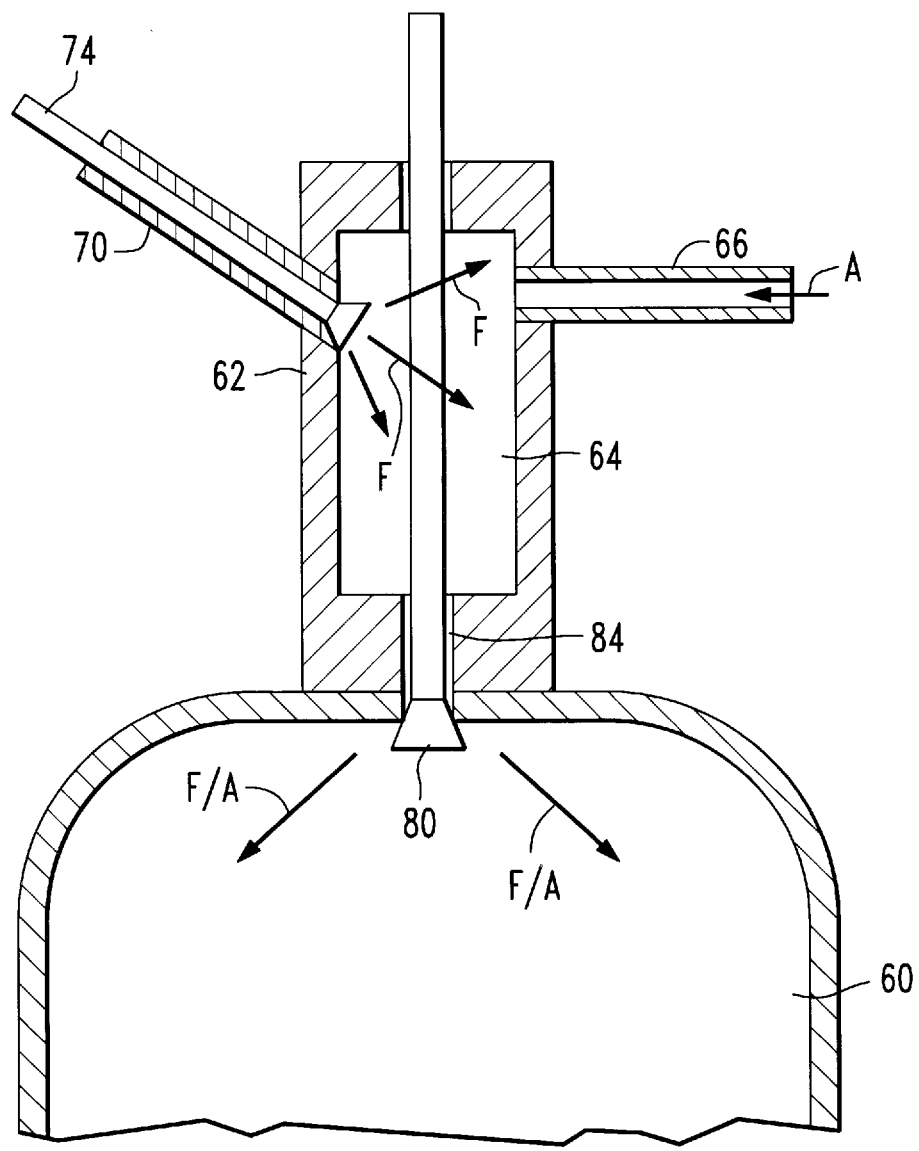
FIG. 6 shows a known fuel injector system.

FIG. 1 is a representative illustration to show the way in which an engine control unit 10 receives inputs from various sensors and controls various characteristics of the fuel injector operation. As inputs, the engine control unit 10, or ECU, receives information relating to the manifold absolute pressure 12, the barometric pressure 14, the speed of the engine 16 and the charge air temperature 18. The manifold absolute pressure 12 represents the pressure within the intake manifold of the engine. The barometric pressure 14 represents ambient pressure surrounding the engine. The speed of the engine is measured in rpm 16 and the charge air temperature 18 is taken within the manifold to measure the temperature of the air entering the combustion chamber. Using this information, the engine control unit determines the length of time, as a function of the crankshaft rotation or piston movement, during which fuel should be metered into the chamber of the fuel injector. This is a function of the quantity of fuel desired and the rate at which the fuel can be delivered to the chamber (see reference numeral 64 in FIG. 6) of the fuel injector system. Once the length of the fuel injection is determined, the end of fuel point EOF, and pulse width duration can be determined. A fuel-air delay FAD determines the time difference between the end of fuel point EOF and the start of air point SOA. The required mass of air injected into the combustion chamber for proper combustion then determines the length of the air injection. This, in turn, determines the end of air point EOA as a function of the start of air point SOA. It should be recognized that many considerations can be used in determining the various points shown in FIG. 1. However, the present invention is not limited to any particular method or technique used to determine the base values of the start of fuel point SOF, the end of fuel point EOF, the fuel-air delay FAD, the start of air point SOA or the end of air point EOA. These basic magnitudes can be determined through many different parameters that are well known to those skilled in the art. The difference between the present invention and known systems is that the present invention determines an offset, or correction factor, for the start of air point SOA based on the magnitude of the barometric pressure, or atmospheric pressure surrounding the engine.

The engine control unit, or ECU, determines the magnitude of fuel that should be used for the next combustion event within the combustion chamber. That amount, typically measured in milligrams, is determined as a function of many inputs, including the engine speed and throttle position.

Figure 2:
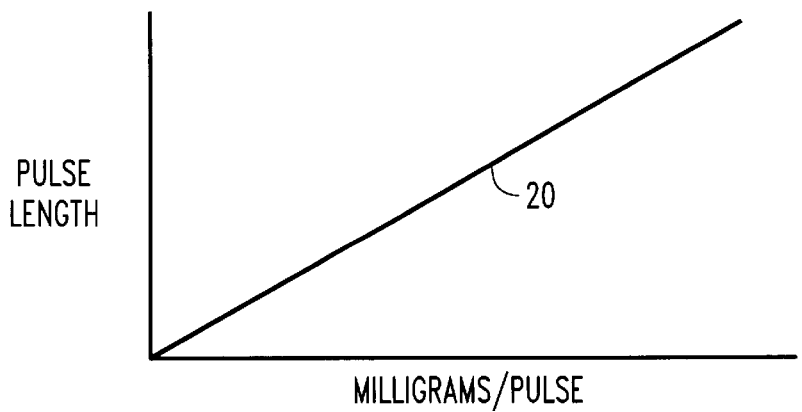
FIG. 2 shows the relationship between the pulse length of a fuel injection pulse and the required milligrams of fuel for each pulse.

When the magnitude of fuel is determined, a known relationship such as that shown in FIG. 2 can be used to determine the required pulse length based on the desired milligrams of fuel per pulse that is required. The required pulse length is a function of the desired milligrams per pulse and the rate at which fuel can be delivered to a chamber of the fuel injector. That fuel delivery rate determines the slope of line 20 in FIG. 2. It also determines the fuel injector pulse width. It should be understood that the horizontal axis in FIG. 1 is measured in degrees of rotation of the crankshaft. However, since the revolutions per minute, or RPM, of the engine can be measured, the horizontal axis is equivalent to time for any specific engine speed.

In the combustion chamber of an internal combustion engine, at least two distinct types of fuel/air mixtures can occur. One type of mixture is referred to as homogeneous and the other is referred to as stratified. In a homogeneous mixture, the fuel/air ratio in all parts of the combustion chamber are generally uniform. In a stratified mixture, a region of the combustion chamber contains virtually all of the fuel and is surrounded within the combustion chamber with air that has virtually no fuel entrained within it. The region where the fuel is contained is in the form of a plume that has a relatively high fuel/air ratio. In other words, the mixture within this plume is fuel rich. There are certain advantages to operating with a stratified mixture at certain speeds. These advantages are very well known to those skilled in the art and will not be repeated herein. In most spark ignited stratified charge internal combustion engines, the mixture is stratified at low to medium loads and is homogenous at high loads and speeds. For example, in outboard motors, the internal combustion engine runs with a stratified mixture during idling, but operates with a homogenous mixture when running at or near full speed.

With regard to the air flowing through the engine, the quantity of air is determined through the use of well known gas equations. For example, as shown in equation 1 below, it is well known that experimental observations have established that the P-v-T behavior of gases at low density can be described by the equation that states that the pressure P multiplied by the specific volume v is equal to the temperature T multiplied by the universal gas constant R. Converting the specific volume v to the actual volume V results in equation 2 that contains the mass term m. Because of the characteristics relating to the nonequlibrium airflow process of an internal combustion engine, it is common to express this relationship of equation 2 in the manner represented by equation 3 where the volumetric efficiency term η is also included.

$$Pv = RT \quad (1)$$

$$PV = mRT \quad (2)$$

$$m = (PV/RT)(\eta) \quad (3)$$

Figure 3:
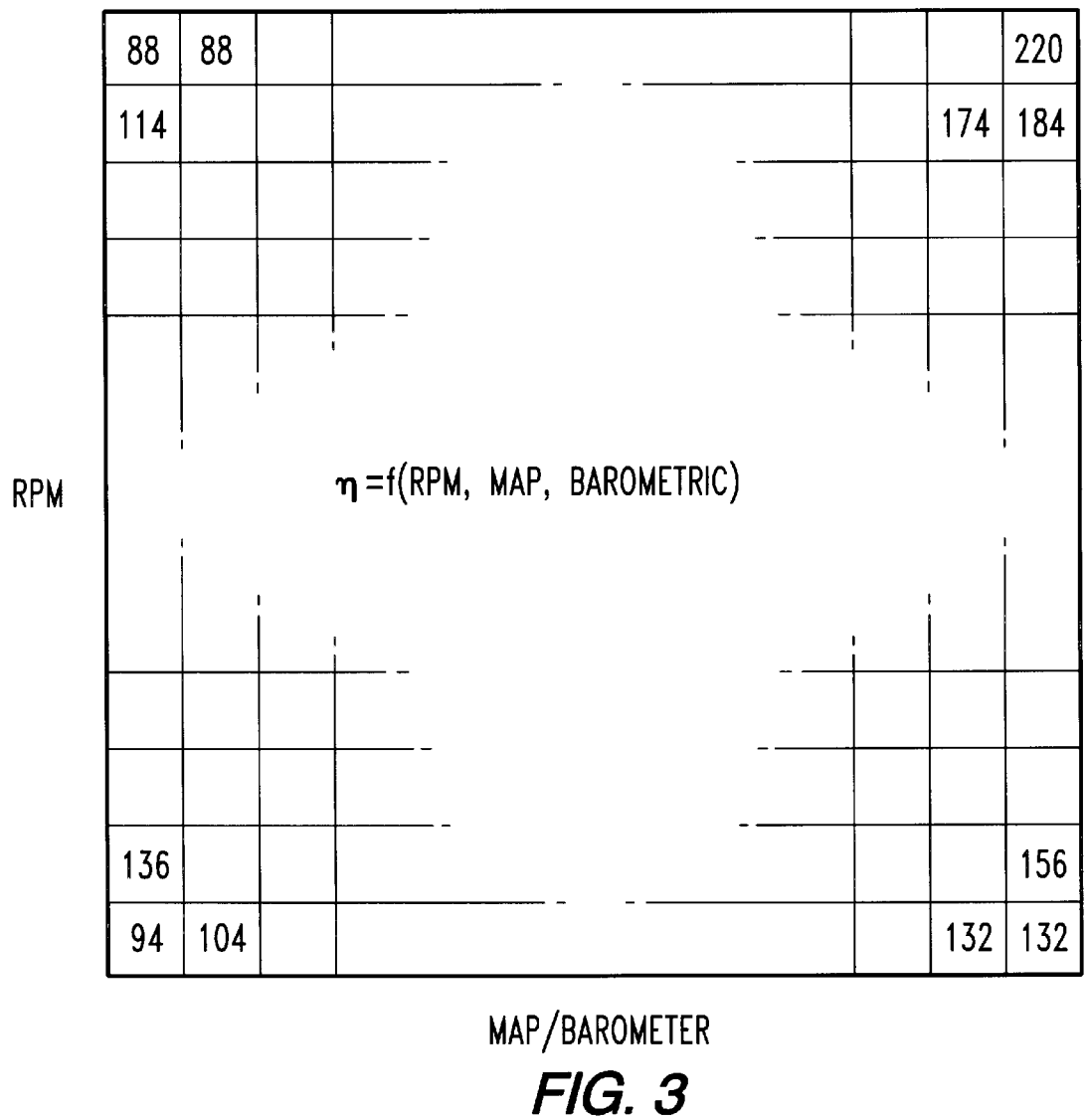
FIG. 3 represents a table containing volumetric efficiency terms for various engines speeds and map/barometer ratios.

The volumetric efficiency term, which is calibrated for all engines to define the specific and particular characteristics, is determined as a function of engine speed, manifold absolute pressure and barometric pressure. In a particularly preferred embodiment of the present invention, a microprocessor is used as the engine control unit and the volumetric efficiency term η is stored in a table which comprises a seventeen by seventeen matrix. FIG. 3 is illustrative of that table. The range of engine speed, measured in RPM, is divided into seventeen ranges and used to index the table along the vertical dimension in FIG. 3. The horizontal dimension is also divided into seventeen ranges, but the ranges are various magnitudes of the manifold absolute pressure divided by the barometric pressure. Using these horizontal and vertical indices, each of the 289 values stored in the table can be individually addressed. In other words, the engine control unit determines the appropriate RPM range and the appropriate range for the map/barometer index and selects the appropriate value for the volumetric efficiency term η where the RPM row and the map/barometric column intersect.

With reference to equation 3 described above, the pressure P is the manifold absolute pressure and the volume V is the cylinder volume. The temperature T is the temperature of the air flowing into the combustion chamber through the intake manifold and R is the universal gas constant. Since all of the values on the right side of equation 3 can be measured or determined as a characteristic of the engine during calibration, the mass m can be calculated. This represents the mass of air that is flowing through the engine of the particular operating point of interest. The mass of air calculated by equation 3 is used to determine fuel mass injected when the engine is running with a homogenous mixture within its combustion chamber. It is therefore helpful to be able to determine, for any particular engine design, whether or not the mixture is homogenous for any specific engine speed and map/barometer ratio.

Figure 4:
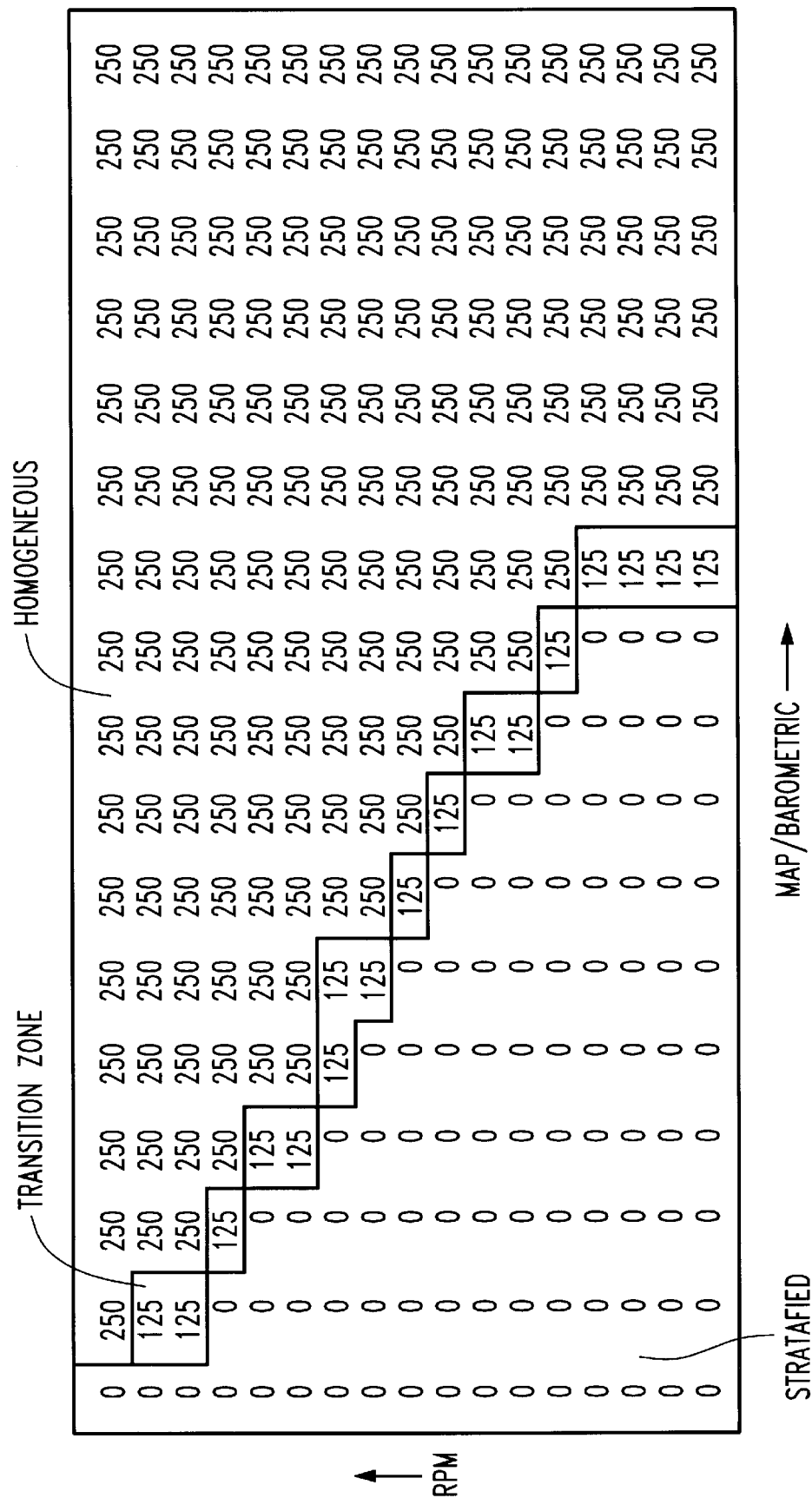
FIG. 4 represents a table containing identifications of stratified, homogenous, and transition conditions for an engine as a function of engine speed and map/barometric pressure ratio.

FIG. 4 shows a seventeen by seventeen matrix stored in the memory of a microprocessor. As can be seen, the stratified/homogenous characteristic of the mixture for these variable conditions is defined by a "zero" for stratified conditions and "250" for homogenous conditions. Between these two zones, a transition zone is defined by the two dashed lines in FIG. 4. This transition zone is represented by "125" in the matrix locations.

It should be understood that in some engine control units the techniques and processes used to determine and calculate various parameters are different for stratified conditions as compared to homogenous conditions. The information stored in FIG. 4, for a particular engine package, determines whether the engine control algorithm will use the processes defined for a stratified mixture, the processes defined for a homogenous mixture, or a mathematical combination of both. This decision is based on whether the table in FIG. 4 contains a "zero", a "250" or a "125".

In many types of engine control units, the information described above, in conjunction with FIGS. 2, 3 and 4 is sufficient to determine the fuel injector pulse width, the start of air point SOA, and the end of air point EOA. The present invention makes an additional computation to accommodate for changes in barometric pressure that could otherwise adversely affect the operation of the engine. For example, reduced atmospheric pressure, such as that experienced at high altitudes, results in fewer molecules of air in any particular volume.

Figure 5:
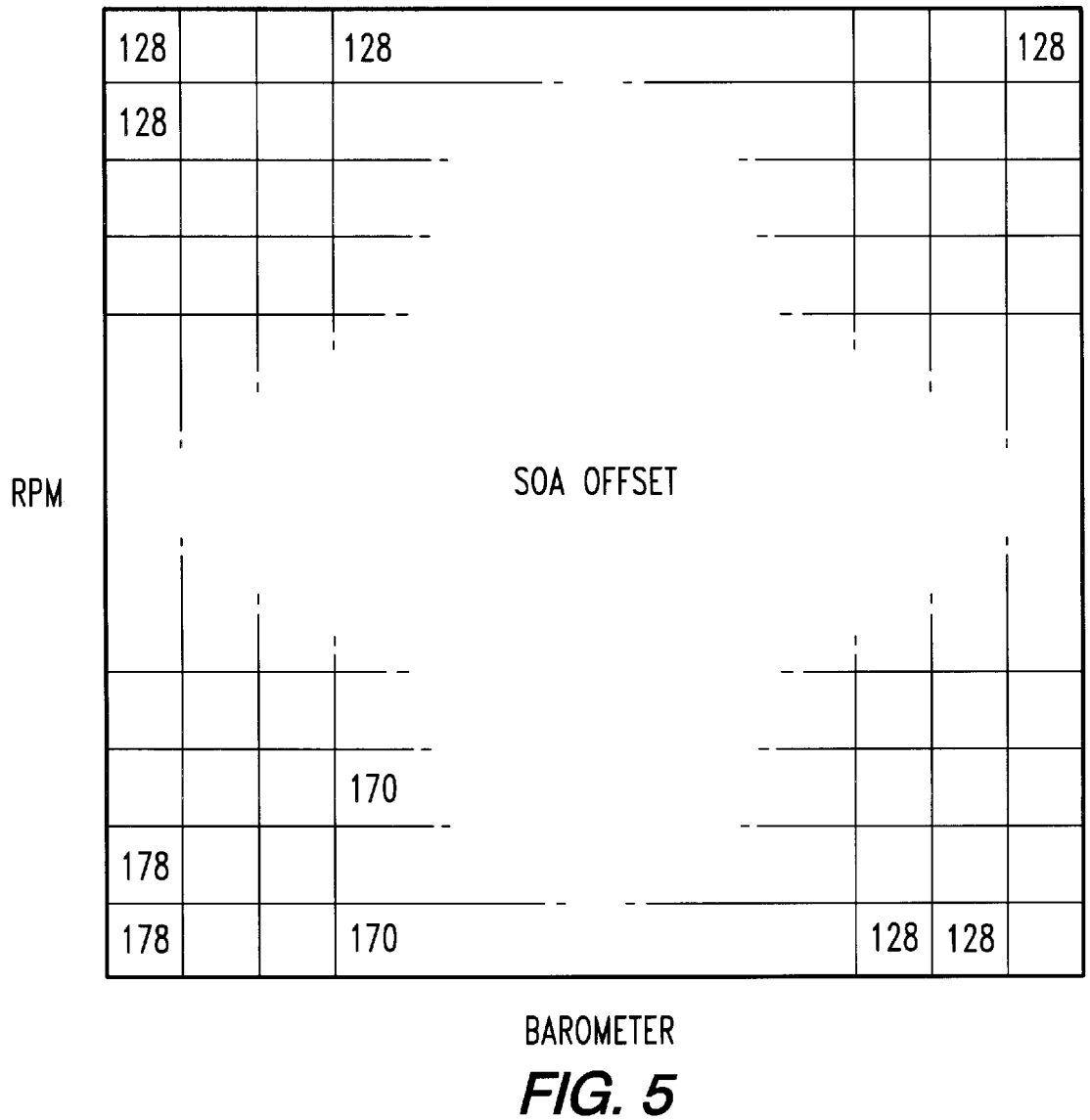
FIG. 5 shows a table of offset values for the start of air point SOA of an internal combustion engine with a fuel injector.

The illustration of FIG. 5 shows a representative table, stored in the microprocessor of the ECU, that contains a seventeen by seventeen matrix of offsets used to correct the start of air point SOA as a function of engine speed and barometric pressure. For convenience, the sizes of the matrices illustrated in FIGS. 3, 4 and 5 were selected to be identical to each other in dimension. However, it should be understood that this identity of size, where each of the matrices are seventeen by seventeen, is not required in all embodiments of the present invention. When all of the other calculations and determinations are made, the microprocessor of the engine control unit uses the table shown in FIG. 5 to select an SOA offset based on both engine speed and barometric pressure. This offset is then added to the SOA magnitude previously determined by the micro-processor of the engine control unit.

In a system made in accordance with the present invention, the standard variables relating to the fuel injection system are determined in a manner that are generally known to those skilled in the art, but an additional offset is provided for the start of air point SOA based on the magnitude of the barometric pressure. This allows the engine control unit to achieve efficient operation of the engine regardless of the altitude at which the engine is operated. This change represents a significant improvement to engine control units and, more particularly, to engine control units for outboard motors.

We claim:

1. A method for controlling a fuel injector system of an internal combustion engine having at least one piston disposed within a cylinder, comprising:

measuring the speed of said engine;

measuring barometric pressure;

measuring the absolute pressure within a manifold of said engine;

determining the piston position at which to begin fuel flow into said fuel injector system;

determining the piston position at which to end fuel flow into said fuel injector system;

determining the piston position at which to begin air flow from said fuel injector system and into said cylinder;

determining the piston position at which to end air flow from said fuel injector system and into said cylinder;

altering said piston position at which to begin said air flow as a function of said barometric pressure.

2. The method of claim 1, further comprising:

measuring an air charge temperature of said engine;

determining a volumetric efficiency term as a function of said engine speed and a ratio of said absolute pressure within said manifold to said barometric pressure; and determining a mass air flow into a combustion chamber of said engine as a function of said temperature, said absolute pressure within said manifold and said barometric pressure.

3. The method of claim 2, further comprising:

determining said piston position at which to begin fuel flow into said fuel injector system and said piston position at which to end fuel flow into said fuel injector system as a function of a desired engine speed and a fuel flow rate empirically determined for said engine.

4. The method of claim 1, wherein:

said engine is a two cycle engine.

5. The method of claim 1, wherein:

said engine is disposed within an outboard motor.

6. The method of claim 1, wherein:

said controlling method is performed by an engine control unit comprising a microprocessor.

7. The method of claim 6, wherein:

a first look-up table stored in memory is used to determine the piston position at which to begin air flow from said fuel injector system and into said cylinder and to determine the piston position at which to end air flow from said fuel injector system and into said cylinder.

8. The method of claim 6, wherein:

a second look-up table stored in memory is used to alter said piston position at which to begin said air flow as a function of said barometric pressure.

9. A method for controlling a fuel injector system of an internal combustion engine having at least one piston disposed within a cylinder, comprising:

measuring the speed of said engine;

measuring barometric pressure;

measuring the absolute pressure within a manifold of said engine;

determining the piston position at which to begin fuel flow into said fuel injector system;

determining the piston position at which to end fuel flow into said fuel injector system;

determining the piston position at which to begin air flow from said fuel injector system and into said cylinder;

determining the piston position at which to end air flow from said fuel injector system and into said cylinder;

measuring an air charge temperature of said engine;

determining a volumetric efficiency term as a function of said engine speed and a ratio of said absolute pressure within said manifold to said barometric pressure;

determining a mass air flow into a combustion chamber of said engine as a function of said temperature, said absolute pressure within said manifold and said barometric pressure; and altering said piston position at which to begin said air flow as a function of said barometric pressure.

10. The method of claim 9, further comprising:

determining said piston position at which to begin fuel flow into said fuel injector system and said piston position at which to end fuel flow into said fuel injector system as a function of a desired engine speed and a fuel flow rate empirically determined for said engine.

11. The method of claim 10, wherein:

said engine is a two cycle engine.

12. The method of claim 11, wherein:

said engine is disposed within an outboard motor.

13. The method of claim 12, wherein:

said controlling method is performed by an engine control unit comprising a microprocessor.

14. The method of claim 13, wherein:

a first look-up table stored in memory is used to determine the piston position at which to begin air flow from said fuel injector system and into said cylinder and to determine the piston position at which to end air flow from said fuel injector system and into said cylinder.

15. The method of claim 14, wherein:

a second look-up table stored in memory is used to alter said piston position at which to begin said air flow as a function of said barometric pressure.

16. A method for controlling a fuel injector system of an internal combustion engine having at least one piston disposed within a cylinder, comprising:

measuring the speed of said engine;

measuring barometric pressure;

measuring the absolute pressure within a manifold of said engine;

determining the piston position at which to begin fuel flow into said fuel injector system;

determining the piston position at which to end fuel flow into said fuel injector system, said steps of determining said piston position at which to begin fuel flow into said fuel injector system and said piston position at which to end fuel flow into said fuel injector system is performed as a function of a desired engine speed and a fuel flow rate empirically determined for said engine;

determining the piston position at which to begin air flow from said fuel injector system and into said cylinder;

determining the piston position at which to end air flow from said fuel injector system and into said cylinder;

measuring an air charge temperature of said engine;

determining a volumetric efficiency term as a function of said engine speed and a ratio of said absolute pressure within said manifold to said barometric pressure;

determining a mass air flow into a combustion chamber of said engine as a function of said temperature, said absolute pressure within said manifold and said barometric pressure; and altering said piston position at which to begin said air flow as a function of said barometric pressure.

17. The method of claim 16, wherein:

said engine is a two cycle engine.

18. The method of claim 17, wherein:

said engine is disposed within an outboard motor.

19. The method of claim 18, wherein:

said controlling method is performed by an engine control unit comprising a microprocessor.

20. The method of claim 19, wherein:

a first look-up table stored in memory is used to determine the piston position at which to begin air flow from said fuel injector system and into said cylinder and to determine the piston position at which to end air flow from said fuel injector system and into said cylinder; and a second look-up table stored in memory is used to alter said piston position at which to begin said air flow as a function of said barometric pressure.

* * * * *